July 1, 1952        L. NEWMAN        2,601,803
FASTENING MEANS
Filed Nov. 4, 1948
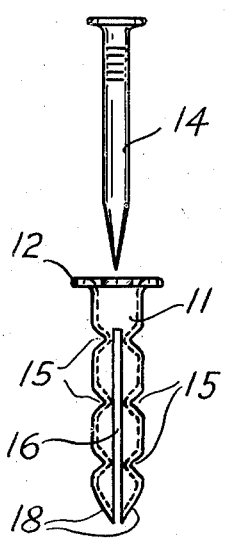
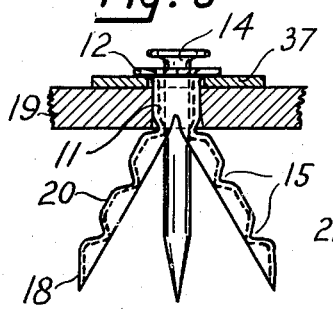
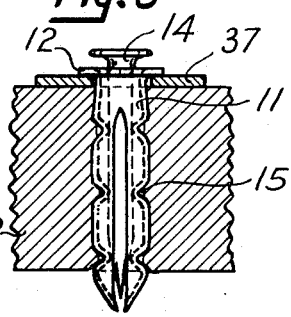
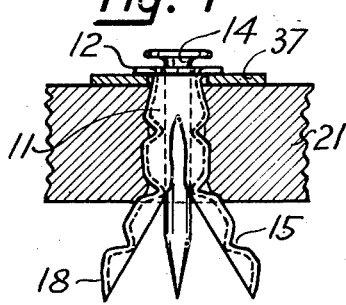
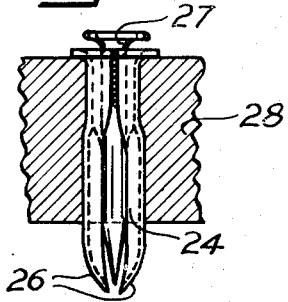
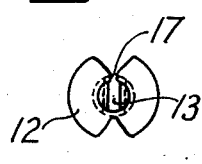
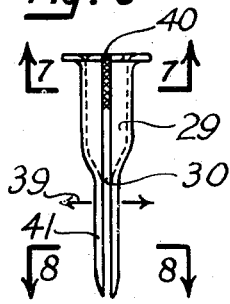
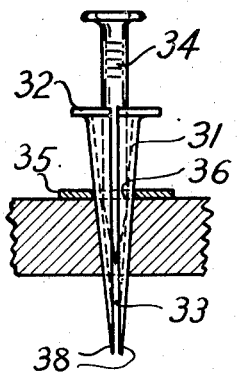
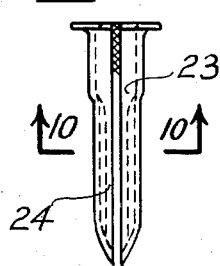
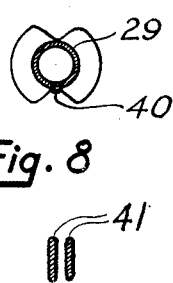
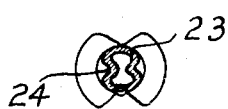
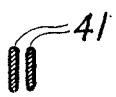
Leopold Newman
INVENTOR Patented July 1, 1952

2,601,803

UNITED STATES PATENT OFFICE 2,601,803

FASTENING MEANS

Leopold Newman, New York, N. Y., assignor, by direct and mesne assignments, to Falcon Fasteners, Inc., New York, N. Y., a corporation of New York Application November 4, 1948, Serial No. 58,309

3 Claims. (Cl. 85—38)

The present invention relates to fastening means, such as nails, hooks, or the like adapted to be driven into walls.

It is the main object of the invention to provide fastening means of the indicated type which can be driven into material of varying thickness irrespective of the length of the fastening means.

It is another object of the present invention to provide fastening means which, due to their particular profile, will be securely anchored in the surrounding material and will be assured against working loose therefrom.

It is a further object of the invention to provide fastening means which can be made by a simple and inexpensive manufacturing process.

Other objects and advantages of the invention will become apparent from the following description and the accompanying drawing, in which several embodiments of the fastening means according to the invention have been illustrated by way of example.

Generally speaking, the invention consists in a nail-type fastening means having a hollow body slotted over the entire length or a substantial part thereof, so as to form practically two parts which are connected in the upper part of the body. The surface of the body has an uneven profile, so that some portions are closer to the longitudinal axis of the fastener than others. The body may, for example, have one or more indentations, such as dents or grooves, formed on the surface, which form corresponding projections on the inside of the hollow shaft. According to another embodiment of the invention, the lower body portion is flattened longitudinally.

This fastening means is designed for use with a pin or a nail which closely fits into the body and which is capable, upon its being driven into said body, of bearing on the projecting portions, or the portions lying closer to the body axis than others, thereby forcing the wall of the fastening means toward the outside and causing the same to be securely anchored in the material in which it is to be embedded.

In case of dents or grooves being formed on the surface of the body, the direction thereof with respect to the axis of the fastener is not critical. The indentations may either be transverse or parallel to the axis, or at an angle therewith. The dents may extend over a smaller or greater length or may simply form a projecting boss on the inside of the body.

In yet another embodiment, the invention comprises a conically shaped fastener which is used in coaction with a washer element; this washer stops the fastener in a predetermined position from being driven further into the wall. The protruding part of the fastener serves as a hook.

In order that my invention may be more fully understood, it will now be described with reference to the accompanying drawing. While, in the following description, the invention will be referred to as a "fastener" I want it to be understood that it likewise includes similar fastening means such as hooks, nails, or spikes.

In the drawing,

Fig. 1 is a side elevation of a fastener according to the invention, showing also the pin or nail before insertion;

Fig. 2 is a top view of the head of the fastener;

Figs. 3 to 5 illustrate, in side view and section, respectively, the fastener according to the invention inserted in walls of three different thicknesses, with fixtures fastened thereby;

Fig. 6 is a side elevation of another embodiment of the fastener according to the invention;

Figs. 7 and 8 are cross sections along lines 7—7 and 8—8, respectively, of Fig. 6;

Fig. 9 is a side elevation showing another embodiment of the invention;

Fig. 10 is a cross section along line 10—10 of Fig. 9;

Fig. 11 shows a side elevation of the fastener according to Figs. 9 and 10, after having been driven into a wall; and Fig. 12 is a side elevation of yet another embodiment of the fastener according to the invention.

Referring more particularly to Figs. 1–5 of the drawing, the fastener comprises a hollow shaft 11 and a head 12 with a central opening 13 for receiving a driving pin or nail 14. Along the length of the shaft, a number of transverse dents 15 are provided in the wall of the fastener, which form corresponding projections inside of the hollow shaft. The shaft is slotted over the entire length as shown at 16, so as to form two parts which contact each other along the edges extending parallel to the axis of the fastener. At the upper end the parts are held together by the head portion which may have a cut-out portion 17 on one side or on both sides, as shown in the drawing, which facilitates the bending back of the head. The two lower ends of the split shaft are tapered and form together the conical tip 18. A fixture 37 is attached to the wall.

Figs. 3–5 illustrate the way in which the dents work in anchoring the fastener in walls of different thicknesses, when pin 14 is driven in. As the pin advances within the shaft, it gradually bears on two opposite dents 15 and thereby not only forces the fastener to spread, but also causes the portions 20 between the dents to become anchored in the wall by expanding. As will be seen from wall sections 19, 21, and 22, the thickness of the wall is not material, since there will always be one or more dents to function in the manner just described, even when the fastener is shorter than the thickness of the wall. Thus it is possible to use a fastener with one and the same length for walls of different thicknesses.

In case the fastener is of greater length than corresponds to the thickness of the wall, the protruding tips will spread apart. This is likewise due to the action of the pin which upon advancement into the shaft, first presses the projecting portions 20 tightly against the wall, and then splits the protruding tips. In this case an additional securing of the fastener will be achieved. It will, therefore, be understood that the action of the fastener of this invention is two-fold: it comprises expansion within the wall and spreading behind the wall. This double action makes the fastener suitable for use in soft, brittle, as well as hard materials, regardless of their thickness.

Figs. 9, 10, and 11, illustrate another embodiment of the fastener according to the invention, which is likewise based on the principle of a dented shaft. However, instead of having dents in a transverse direction to the main axis of the fastener, in the embodiment shown in these figures the dents are parallel to that axis.

The shaft is indicated at 23, the longitudinal dents at 24. In the embodiment shown, two dents are formed on the shaft, but it should be understood that a larger number may be provided if necessary or convenient. The dents 24 preferably start at a certain distance from the head leaving room for the insertion of the pin or nail.

The two tips forming a conical end of the fastener are designated by 26. In Fig. 11, an illustration is given of a fastener when it has been driven into a wall 28 by the action of a pin 27. In this case, too, the pin will bear on the projecting edges of the dents 24 and force the fastener to expand in the wall over almost the entire length of the shaft. A very secure anchoring of the fastener in the wall will thereby be obtained.

The fastener according to the invention may be made from different materials, for instance sheet metal, by die-stamping, die-forming, molding, casting, extruding, or the like. During the forming of the fastener by one of the above named manufacturing processes, it may at the same time be provided with the dents as described and illustrated, if so desired. Alternatively, the dents may be formed in a separate operation.

Fig. 6 illustrates the embodiment of the invention, in which the lower part of the body is given the shape of two flats 41. The body is designated by 29, and has, toward the head, an enlarged portion for the introduction of a pin (not shown). The fastener has two longitudinal slots 30. The head is similar to the heads shown with respect to embodiments one and two of the fastener. As shown in Figs. 6 and 7, the slots 30 are joined at 40 by welding or the like.

Upon advancing within the shaft, the pin forces the two flats 41 of the body lying closer to the axis, in the direction of the arrows 39 toward the outside and thereby causes, as in the other cases, described above, a secure anchorage of the fastener in the surrounding material.

Not only the fastener is firmly anchored in the wall by the expansion of the body within the wall and by the spreading of the tips beyond, but also the fixture to be fastened, such as a bracket or the like, is pressed against and securely held to the supporting surface. An effect like that could hitherto be only achieved by using a screw.

The action of the pin or nail driven into the body of the fastener, not only causes the same to expand, as already described, it also drags along the fastener until its head bears on the wall and is pressed against the same. This in turn presses the fixture against the wall and when the tips of the fastener spread, no backing up is possible, so that the fixture becomes tightly secured.

Figure 12 illustrates another embodiment of the fastener according to the invention, which has a conically shaped body 31, tapering from the head portion 32 down to the tips 38. This fastener has likewise a slot 33 which divides it into two parts held together by the upper portion. A pin for coaction with the fastener is designated by 34. The pin is shown while it is partly driven in. A washer 35 having a central opening 36 is used with the fastener and the size of the opening 36 is so chosen, that the washer stops the fastener in a predetermined position from being driven further into the wall. The protruding part of the fastener serves as a hook.

In this case as well as in the embodiments above described, the body of the fastener may have dents or the like formed therein for the purpose explained more fully with respect to the said embodiments. The conical shape of the fastener and the washer having an opening of a definite size will act in the same way as a stop up to which the fastener may be driven into the wall, and the protruding part of the fastener may again be used as a hook.

When the fastener according to the invention is made of sheet metal by die-cutting in form of a slotted tube-like body, the slot below the head may be closed by any joining operation, such as soldering, welding, fusing or the like, as indicated at 40 in Figs. 6, 9, and 11, of the drawing.

From the description above it will be obvious that the fastener according to the invention may be used in many ways for household and industrial purposes. It anchors to any wall fixtures such as brackets, mirrors, shelves, lamps, kitchen and bathroom fixtures of all kinds, wiring, plumbing, etc. No special tools or skills are required, no drilling, plastering, dowelling, or any other manipulations are necessary, a simple hammering is all that is needed to achieve a secure anchorage in the wall. The saving of time and labor accomplished by the fastener is of great advantage and spells an important improvement over fastening means used heretofore for similar purposes.

While I have thus described and illustrated several specific embodiments of my invention, I want it to be understood that many alterations and modifications may be made therein without departing from the spirit of my invention and the scope of the appended claims.

What I claim is:

1. A nail type fastener comprising a head, an elongated, hollow body, said body being of relatively thin bendable metal longitudinally split into at least two portions over the greater part of its length, each of said portions being generally arcuate in cross section, at least two tapering and separable tips on said body forming one end thereof, each split portion of said body having on the outside at least one V-shaped dent extending transversely substantially from edge to edge of the split portions of the body and forming on the inside a corresponding inwardly extending projection, and a pin fitting into said body and adapted, upon advancement, to bear on said projection for anchoring the fastener in the surrounding material.

2. A nail type fastener comprising a head, including a horizontally and outwardly extending flange on said head, an elongated, generally cylyndrical hollow body, said body being of relatively thin bendable metal and longitudinally split into at least two portions over the greater part of its length, each portion being tapered at its end to form separable pointed tips, and each portion having on the outside a plurality of longitudinally spaced V-shaped dents extending transversely substantially from edge to edge of the split portions of the body and forming on the inside corresponding inwardly extending projections, and a pin fitting into said body and adapted, upon advancement, to bear on said projections, thereby causing anchorage of said fastener in the surrounding material.

3. A nail type fastener comprising a head, an elongated, generally cylindrical hollow body, said body being of relatively thin bendable metal longitudinally split into at least two portions over the greater part of its length, said portions at one end of the body each being tapered to form separable, pointed tips, each split portion of said body having on the outside and longitudinally spaced from each other a plurality of V-shaped dents with the bights thereof extending transversely substantially from edge to edge of the split portions of the body and forming on the inside corresponding inwardly extending projections, and a pin fitting into said body and adapted, upon advancement, to bear on said projections, thereby causing anchorage of said fastener in the surrounding material.

LEOPOLD NEWMAN.

REFERENCES CITED

The following references are of record in the file of this patent:

UNITED STATES PATENTS

| Number | Name | Date |
| --- | --- | --- |
| Re. 13,204 | Jossart | Feb. 14, 1911 |
| 1,084,870 | Thorp | Jan. 20, 1914 |
| 1,138,219 | Hottenroth | May 4, 1915 |
| 1,452,514 | Karitzky | Apr. 24, 1923 |
| 1,559,619 | Karitzky | Nov. 3, 1925 |
| 1,637,419 | Klein | Aug. 2, 1927 |
| 1,800,968 | Tomkinson | Apr. 14, 1931 |
| 1,855,329 | Wagner | Apr. 26, 1932 |
| 2,058,338 | Meissner | Oct. 20, 1936 |